May 16, 1939.  A. V. DE FOREST ET AL  2,158,409
TESTING METHOD AND APPARATUS
Filed April 11, 1936    2 Sheets-Sheet 1
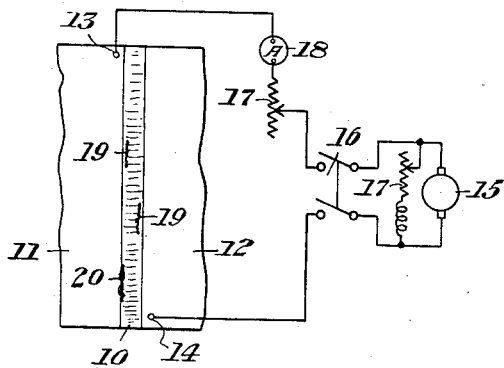
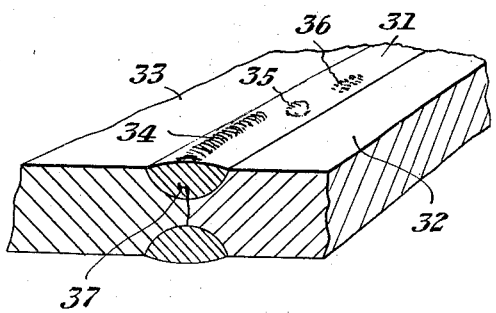
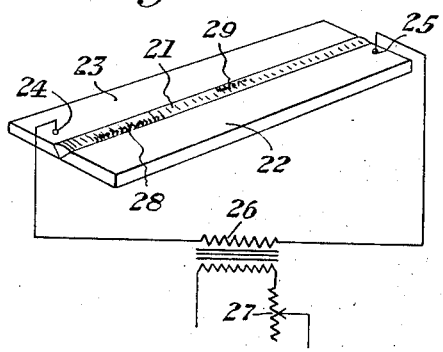
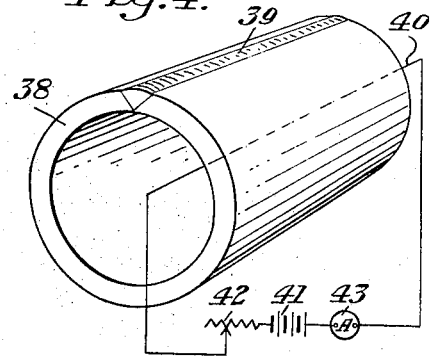
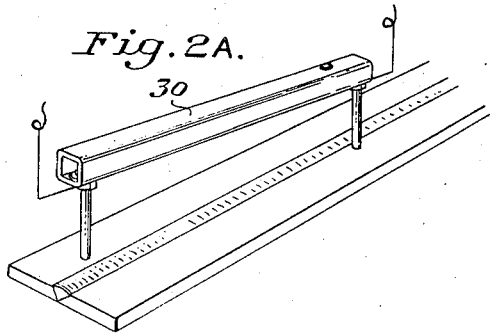
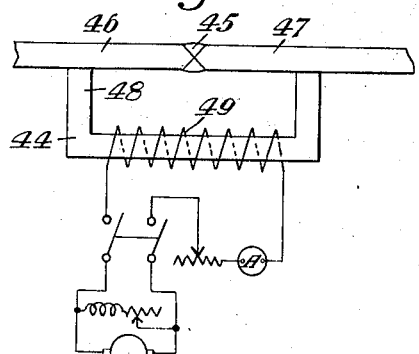
INVENTORS
Alfred V. de Forest &
Foster B. Doane
by their attorneys
Stebbins Blenko & Parmelee Patented May 16, 1939

2,158,409

UNITED STATES PATENT OFFICE 2,158,409

TESTING METHOD AND APPARATUS

Alfred V. de Forest, Marlboro, N. H., and Foster B. Doane, Wilmette, Ill., assignors, by mesne assignments, to Magnaflux Corporation, Chicago, Ill., a corporation of Delaware Application April 11, 1936, Serial No. 73,916

4 Claims. (Cl. 175—183)

This invention relates to the art of testing and, particularly, to the testing of welds or welded joints. Various methods of welding have come into wide use within recent years and welding continues to displace other methods of securing metal members together to a greater and greater extent. For this reason, it is desirable that a knowledge of the precise character of a weld be readily available. The appearance of a weld cannot always be relied on as evidence of its soundness and continuity and these qualities are essential in certain welding applications.

Various types of defects are apt to occur in welding joints such as cracks, discontinuities, slag inclusions, gas pockets, and flaws such as shrinkage cracks, lack of fusion, porosity, and cold shuts. We have invented a method and means for locating such defects and flaws and indicating their character and extent. The presence of such imperfections is highly detrimental to the life, endurance and performance of welds whether deposited or autogenous, fusion, resistance, or flash.

In accordance with our invention, we subject the weld to be tested to the action of a magnetic field, and apply finely divided particles of magnetic material to the weld. These particles are attracted by and cling to the surface of the weld or the base metal at regions where discontinuities exist, by reason of the magnetic polar effects resulting from sudden changes in permeability and consequent lines of flux leakage. The magnetic field may be produced by an electromagnet or by passing current through the welds to be tested. We preferably cause a flow of current along the weld or transversely thereof, or both.

In all cases of fusion welding there exists a difference in permeability between the bead material derived from the welding rod, and the forged or cast metal forming the base material. A line of magnetic leakage thus arises along this boundary. If the base metal is of high carbon or alloy content, a line of hard and brittle metal may be produced in the base at a slight distance from the edge of the deposited bead. Our invention makes it possible to locate such conditions and to indicate whether or not a crack has been formed at the junction between a quenched metal structure resulting from the heat of the weld, and the colder metal of the base remote from the weld. Our method readily distinguishes this hard zone and indicates the presence or absence of a crack in this region.

It is common practice to anneal or normalize welded products of high quality in order to remove this hardened zone. Our method, therefore, may be employed to determine whether or not such annealing or normalizing has been effected. It has been impossible by methods or means known previously to discover such a crack after the normalizing or annealing has taken place.

Shrinkage cracks result from the shrinkage of the weld metal during cooling and may occur in the deposited metal of the bead or in the base metal itself, particularly where the latter contains carbon in excess of .2% or has a significant alloy content.

In our method, the character of a defect is indicated not only by the location of the particles adhering to the specimen, but also by the size of such particles. For this reason, we prefer to employ particles of varying degree of fineness. Our method will also reveal whether proper fusion has been accomplished when dissimilar metals are welded together even where one of them is essentially non-magnetic.

A preferred practice of our invention is illustrated diagrammatically in the accompanying drawings, with certain modifications therein, and a testing apparatus which is especially adapted for the performance of our method.

In the drawings:

Figure 1 is a diagram illustrating the testing of a butt weld between two plates;

Figure 2 is a similar view showing a slightly different type of weld and testing equipment;

Figure 2a is a view showing the apparatus of our invention in use;

Figure 3 is a perspective view of a so-called double-U weld, partly in section, illustrating the character of indication afforded by our invention for certain types of defects;

Figure 4 is a diagram illustrating the manner of testing tubular articles having welded joints;

Figure 5 is a diagram illustrating an alternative method of magnetizing the joint under test;

Figure 6 is a plan view, partly in section, of the testing tool of Figure 2a;

Figure 6:
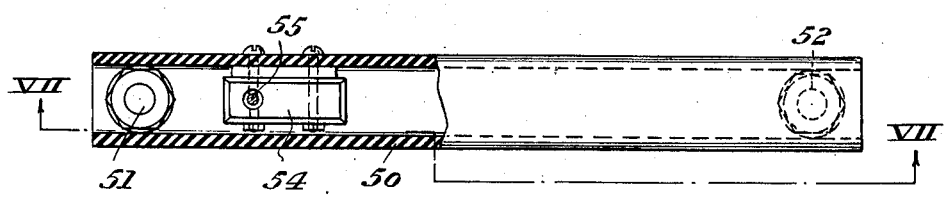

Referring now in detail to the drawings, a welded joint 10 between abutting plates 11 and 12 may be tested, in accordance with our invention, by applying electrical contacts 13 and 14 to points preferably on opposite sides of the joint and spaced apart thereon. Direct or alternating current is supplied to the contacts 13 and 14 from a generator 15 under a control of a switch 16 and a rheostat 17. An ammeter 18 is also employed to indicate the magnitude of the current. The applied voltage may be varied by a field rheostat 17. If the generator 15 is an alternating current generator, the field circuit including the rheostat 17 will be connected to a separate excitation source instead of across the generator. The flow of current between contacts 13 and 14 sets up a magnetic field about the joint 10. Magnetic particles of varying sizes are then applied in any convenient manner to the joint between the contacts. As before stated, the particles will adhere to the joint adjacent any defects which may exist therein and the type of defect is indicated to a certain extent by the amount and character of the adhering particles. Collections of particles as indicated at 19 might indicate cracks in the base metal, below the surface thereof. A collection such as that indicated at 20 might indicate lack of fusion between the base metal and the deposited metal.

Figure 2 shows a V-weld 21 joining plates 22 and 23. Alternating current is caused to flow along and across the joint 21 between contacts 24 and 25. The contacts are connected to the secondary terminals of a transformer 26, the primary of which is connected to any suitable source of alternating current through control rheostat 27.

On application of finely divided magnetic particles to the joint, the defects therein will show up as at 28 and 29. The collection of particles shown at 28 might indicate a crack below the surface of the weld which might be anywhere between the two surfaces of the base metal and might even be closer to the side opposite that to which the deposited metal is applied, than to the latter.

Figure 2a illustrates the use of a testing tool 30 which we have invented as a convenient means of carrying out a testing as indicated in Figure 2. The tool 30 will be described in detail later.

Figure 3 shows a double-U welded joint 31 between relatively thick plates 32 and 33. On subjecting such joint to the test already described, magnetic particles might adhere thereto as shown at 34, 35 and 36. The collection of particles at 34 would indicate a deep lying crack in the weld such as illustrated at 37. Such defects are usually accompanied by the formation of a wide, diffused collection of particles as shown at 34. In contrast, a collection of particles presenting the appearance of a sharp narrow ridge as shown at 19 in Figure 1 would indicate a defect near the surface, perhaps a crack at the surface, but below a thin layer of scale.

A circular collection of particles as shown at 35 in Figure 3 might indicate a blow-hole, whereas a collection such as that at 36 might indicate non-metallic inclusions or porosity of the weld.

In the testing according to the method described, it is not necessary to maintain the flow of current throughout the test, as the residual magnetization of the joint remaining after the flow of current has been terminated will often be sufficient to give the desired indications.

The different types of indications resulting from various kinds of defects are accentuated by using magnetic particles of different sizes and this procedure is, therefore, to be recommended.

Certain defects in a welded joint can be removed by grinding and this invention affords a ready means of determining when such removal has been effected.

Figure 4 illustrates diagrammatically the preferred method of testing a tubular object 38 having a longitudinal welded joint 39. A conductor 40 is disposed axially of the article and connected to a suitable source of current, here illustrated as a battery 41, connected to the conductor 40 in series with a control rheostat 42 and an ammeter 43. Current flowing through the conductor 40 induces a magnetic field circumferentially of the article 38 and the magnetic flux crossing the joint 39 causes the collection of magnetic particles when applied to the joint, at points adjacent defects therein, in accordance with the principles already explained. The conductor 40 may be disposed to make a plurality of turns about the wall of the article 38 instead of a single turn as illustrated. When testing in this manner, a line of particles is frequently formed on each side or "toe" of the weld, but these lines are easily distinguishable from collections of particles indicating cracks, porosity, lack of fusion or other structural defects in the weld.

Figure 5 illustrates the use of an electromagnet 44 for causing magnetic flux to traverse a double-V joint 45 between plates 46 and 47. The electromagnet 44 has a C-shaped core 48 and an exciting coil 49, connected to a current source such as that shown at 15 in Figure 1, with similar control apparatus. The arrangement of Figure 5 is particularly useful in indicating the presence of deep lying defects in the weld or the base metal adjacent the joint. As already indicated, the exciting coil 49 need not be energized throughout the progress of the test as the residual magnetism remaining after deenergizing the coil is sufficient to give good indications.

Our method may be practiced with either alternating or direct current although one or the other may be preferable in certain instances. If the defects to be located lie at or near the surface, alternating current is advantageous for magnetizing the test specimen, because of its well-known skin effect. This concentrates the current at the surface and makes it possible to obtain satisfactory results with a smaller current than would be necessary if direct current were employed.

Figure 7:
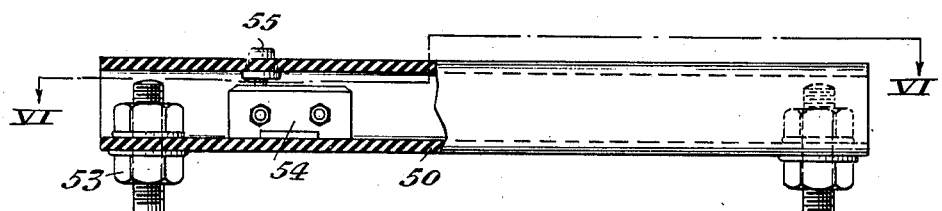
Figure 7 is a side elevation thereof, partly in section.
Figure 8:
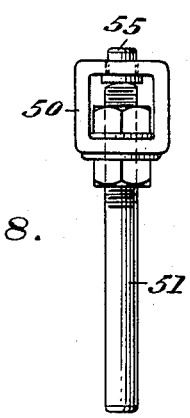
Figure 8 is an end view.

The testing tool 30 is more clearly shown in Figures 6 through 8 and is composed of a hollow tube 50 of insulating material having studs 51 and 52 secured thereto at points spaced therealong. As shown, the studs are secured to the tube by clamping nuts 53. Connections extend from the studs to a suitable source of current. The supply of current to the studs 51 is controlled by a switch 54 mounted within the tube 50. A push button 55 extends through the top of the tube whereby the operator may close the switch 54 when a flow of current through the test specimen is desired. The switch 54 controls a contactor (not shown) effective to connect the studs to their current source.

In some instances, the indication afforded by the magnetic particles will be improved if the latter are coated with lubricant prior to being applied. While the invention has been described as applied chiefly to deposit welds between abutting plate edges, it is obvious that it is also of great advantage in testing resistance welds, as well as those made by filling with weld metal a hole in one of two lapped plates, and other types of welds.

While we have shown the magnetization of the test specimen by passing current along and across the joint, it is not necessary that this precise current path be followed or, indeed that any current be applied if it is desired to use an electromagnet as shown in Figure 5, or other means for producing a magnetic field.

It will be apparent from the foregoing that our invention provides a means for inspecting welds quickly, easily and effectively, at relatively small expense. A longer life, greater endurance and better performance of welds of various types can thus be assured. Actual or incipient defects not visible or otherwise detectable are immediately shown up by our invention. We are also enabled to determine whether a weld has been properly heat treated so as to relieve internal stress, as well as to detect existing defects.

While we have illustrated and described herein only a preferred practice and embodiment of our invention, and certain modifications of the former, it will be understood that many changes in both the procedure and structure illustrated and described may be made without departing from the spirit of the invention or the scope of the appended claims.

We claim:

1. The method of evaluating defects in a weld, which consists of subjecting the weld to the action of a magnetic field by passing current substantially lengthwise of and yet across the weld and bringing in close proximity finely divided paramagnetic particles of differing degrees of fineness and qualitatively identifying the particles adhering to the weld.

2. The method of detecting defects in a weld by making electrical contact therewith on opposite sides of the weld, but at points closely adjacent the weld but spaced at a material distance therealong, passing current through the weld by means of these contacts, applying finely divided paramagnetic material and noting the degrees of adherence of the particles to the weld or the base metal adjacent thereto.

3. A method of detecting defects in welded joints including the steps of passing an electric current substantially lengthwise of and yet across a joint, applying magnetic particles to the joint and noting their adherence thereto.

4. The method of magnetizing welded members, consisting of causing an electric current to flow substantially lengthwise of the weld and yet across the weld from a point on one side of the weld to a relatively distant point on the other side of the weld, said points being adjacent the weld but spaced substantially lengthwise of the weld.

ALFRED V. DE FOREST.
FOSTER B. DOANE.